United States Patent [19]

Kuze et al.

[11] 4,440,924

[45] Apr. 3, 1984

[54] PROCESS FOR PRODUCTION OF POLYESTER

[75] Inventors: Katsuaki Kuze; Yuziro Matsuyama; Hiroshi Hashimoto, all of Shiga; Takeshi Ohta, Tsuruga; Osamu Makimura, Ogaki, all of Japan

[73] Assignee: Toyo Boseki Kabushiki Kaisha, Japan

[21] Appl. No.: 532,624

[22] Filed: Sep. 15, 1983

[30] Foreign Application Priority Data

Oct. 5, 1982 [JP] Japan .................. 57-175895
Oct. 5, 1982 [JP] Japan .................. 57-175896
Oct. 7, 1982 [JP] Japan .................. 57-176682
Oct. 14, 1982 [JP] Japan .................. 57-180663

[51] Int. Cl.$^3$ ............................................. C08G 63/30
[52] U.S. Cl. .................................. 528/275; 528/274; 528/280; 528/286
[58] Field of Search ................ 528/274, 275, 280, 286

[56] References Cited

U.S. PATENT DOCUMENTS

| | | | |
|---|---|---|---|
| 2,641,592 | 6/1953 | Hofrichter | 528/280 |
| 3,641,111 | 2/1972 | Lazarus | 528/274 X |
| 3,842,043 | 10/1974 | Chimura et al. | 528/275 X |
| 4,001,187 | 1/1977 | Itabashi et al. | 528/274 X |
| 4,039,515 | 8/1977 | Rebhan et al. | 528/275 |
| 4,048,086 | 9/1977 | Uffner | 528/280 X |

*Primary Examiner*—Lucille M. Phynes
*Attorney, Agent, or Firm*—Jones, Tullar & Cooper

[57] ABSTRACT

A process for production of a polyester comprising units of ethylene terephthalate as the major repeating units by supplying terephthalic acid and ethylene glycol continuously or intermittently to bis(beta-hydroxyethyl) terephthalate or its oligomer so as to carry out esterification under a pressure of not more than about 1.0 kg/cm$^2$, followed by polycondensation, which is characterized in that at least one magnesium compound is incorporated into the reaction system in an amount of about 30 to 400 ppm in terms of Mg to the polyester when the esterification rate in the step of esterification reaches about 20–80% and at least one phosphorus compound is incorporated into the reaction system in an amount as satisfying the following equation (I) at the stage after the esterification rate reaches not less than about 91% and before the termination of the initial condensation in the step of esterification:

$$1.2 \leq Mg/P \leq 20 \qquad (I)$$

wherein Mg/P is the atomic ratio of the magnesium atom to the phosphorus atom. The produced polyester shows a high electrostatic adherence.

5 Claims, No Drawings

PROCESS FOR PRODUCTION OF POLYESTER

The present invention relates to a process for production of a polyester. More particularly, it relates to a process for production of a polyester comprising units of ethylene terephthalate as the major repeating units with high working efficiency, said polyester being highly improved in various physical properties such as electrostatic adherence, transparency, color tone, clarity and heat resistance.

Saturated linear polyesters such as polyethylene terephthalate are useful as packing materials, photographic films, electric insulating materials, magnetic tapes, etc. owing to their excellent properties in mechanical strength, heat resistance, weather resistance, electric insulation, chemical resistance, etc. Usually, polyester films are prepared by melt extrusion of a polyester, followed by biaxial stretching. In order to assure a good uniformity of such films in thickness and enhance the casting speed, it is necessary to attain the quick quenching of a melt extruded sheet from an extrusion orifice on a rotating quenching drum with the intimate contact between the melt extruded sheet and the surface of the quenching drum. The intimate contact can be achieved effectively by supplying a high electric voltage to a wire electrode disposed between the orifice and the quenching drum to produce a static electricity at the surface of the extruded sheet before solidification.

It is known that the electrostatic adherence (i.e. the intimate contact owing to a static electricity) of a polyester sheet is enhanced with the increase of the electric charge at the surface of the sheet. It is also known that the electric charge at the surface of a polyester sheet is increased by modifying the polyester used for preparation of the sheet so as to lower its specific resistance. It is further known that the specific resistance of a polyester can be lowered by incorporation of an alkali metal or alkaline earth metal compound into the reaction system immediately after the esterification or the ester exchange. This method is surely effective in lowering the specific resistance of a polyester and enhancing the electrostatic adherence of the sheet made thereof but simultaneously produces the deterioration of the filtrability of the oligomer as the intermediate in the production of a polyester. This is quite disadvantageous for production of a polyester sheet having a high clarity, because such high clarity is usually attained by subjecting the oligomer to filtration. Further, the difficult filtrability naturally results in lowering of the working efficiency. These disadvantages are particularly serious when the polyester is produced by the direct polymerization process wherein terephthalic acid and ethylene glycol are subjected to esterification and the resultant bis(betahydroxyethyl) terephthalate or its oligomer is subjected to polycondensation.

Besides, the polyester as the starting material for manufacture of a polyester sheet is required to be low in the content of diethylene glycol and excellent in heat resistance. When the diethylene glycol content is high, the softening point is lowered so that the breakage of the resulting sheet is apt to occur on stretching. This naturally makes the working efficiency inferior. When the heat resistance is poor, it is hardly possible to reuse the off-grade sheet or the unnecessary edge portion of the sheet inevitably produced on stretching for preparation of a fresh sheet through melting.

As a result of the extensive study on the production of a polyester improved in electrostatic adherence, transparency, color tone and clarity and showing a high softening point and a good heat resistance, it has been found that the introduction of certain amounts of certain metal compounds into the reaction system for production of the polyester at the certain stages can afford the polyester provided with the said favorable characteristics. Advantageously, the oligomer as the intermediate in the production of the polyester shows a good filtrability, and the working efficiency in the production of the polyester is thus excellent. This invention is based on the above finding.

According to the present invention, there is provided a process for production of a polyester comprising units of ethylene terephthalate as the major repeating units by supplying terephthalic acid and ethylene glycol continuously or intermittently to bis(beta-hydroxyethyl) terephthalate or its oligomer so as to carry out esterification under a pressure of not more than about 1.0 kg/cm$^2$, followed by polycondensation, which is characterized in that at least one magnesium compound is incorporated into the reaction system in an amount of about 30 to 400 ppm in terms of Mg to the polyester when the esterification rate in the step of esterification reaches about 20–80%, at least one phosphorus compound is incorporated into the reaction system in an amount as satisfying the following equation (I) at the stage after the esterification rate reaches not less than about 91% and before the termination of the initial condensation in the step of esterification:

$$1.2 \leq Mg/P \leq 20 \quad (I)$$

wherein Mg/P is the atomic ratio of the magnesium atom to the phosphorus atom and optionally at least one alkali metal compound is incorporated into the reaction system in an amount as satisfying the following equation (II) at any stage before the termination of the initial condensation in the step of esterification:

$$3.0 \leq M \leq 50 \quad (II)$$

wherein M is the amount (expressed in ppm) of the alkali metal comopound in terms of the alkali metal atom to the polyester and/or at least one cobalt compound is incorporated into the reaction system in an amount as satisfying the following equation (III) at any stage before the termination of the initial condensation in the step of esterification:

$$3.0 \leq Co \leq 50 \quad (III)$$

wherein Co is the amount (expressed in ppm) of the cobalt compound in terms of the cobalt atom to the polyester.

When desired, at least one of tertiary amines and quaternary ammonium salts may be incorporated into the reaction system in an amount of about 0.01 to 1 mol % to the polyester at any stage before the termination of the initial condensation in the step of esterification.

The termination of the initial condensation may be defined as the point at which the intrinsic viscosity of the reaction system reaches up to about 0.2.

The polyester of this invention comprises units of ethylene terephthalate as the major repeating units. Thus, it may comprise not less than about 80 mol % of units of ethylene terephthalatethe. Other monomeric units which may be present in the polyester are units of dicarboxylic acids such as isophthalic acid, 2,6-naphthalenedicarboxylic acid, 4,4'-dicarboxydiphenyl, 4,4'- dicarboxybenzophenone, bis(4-carboxyphenyl)ethane, adipic acid, sebacic acid and 5-sodium sulfoisophthalic acid, units of diols such as propylene glycol, butanediol, neopentyl glycol, diethylene glycol, cyclohexanedimethanol and bisphenol A/ethylene oxide adduct, units of hydroxycarboxylic acids such as p-(beta-hydroxyethoxy)benzoic acid, etc. Monomeric units which form amide bonds, urethane bonds, ether bonds, carbonate bonds, etc. may be also included in the polyester.

The esterification and the polycondensation in the process of this invention may be carried out by per se conventional procedures except incorporation of certain amounts of some certain compounds into the reaction system at certain stages.

The esterification may be conducted batchwise or continuously. Usually, the continuous process using, for instance, 2 to 4 reaction vessels, is favorable, because the quality of the product is kept constant and the reaction can be readily controlled.

Bis(beta-hydroxyethyl) terephthalate or its oligomer to which terephthalic acid and ethylene glycol are supplied may be prepared by the direct esterification process or by any other process such as the ester exchange process.

The esterification may be carried out under any pressure of not more than about 1.0 kg/cm$^2$, preferably under the atmospheric pressure. A pressure exceeding about 1.0 kg/cm$^2$ will unfavorably increase the by-production of diethylene glycol. The oligomer may be present in any amount in the reaction system at the initiation of the esterification, but its amount is preferred to be so controlled that the molar amount of the acid component in the oligomer at the initiation of the esterification is from about 1/5 to 1/2 of that at the end of the esterification.

Terephthalic acid and ethylene glycol are usually introduced into the reaction system as a slurry, because of easy handling and accurate measuring. In the slurry, the molar ratio of ethylene glycol and terephthalic acid is preferred to be from about 1.05 to 2.0, particularly from about 1.10 to 1.30. When the molar ratio is less than about 1.05, handling of the slurry is difficult. When more than about 2.0, the by-production of diethylene glycol is increased. The slurry may be prepared by the use of any conventional mixing apparatus and supplied to the reaction system continuously or intermittently by the aid of a supply pump.

The esterification is usually carried out at a temperature between about 210° C. and 270° C. When the temperature is below about 210° C., the reaction period is longer, and the production becomes uneconomical. When the temperature is beyond about 270° C., the by-production of diethylene glycol and the coloration of the product are increased.

The polycondensation may be conducted batchwise or continuously. Suitable temperature for polycondensation is below 280° C. and preferably from 270 to 275° C. A higher temperature will increase the by-production of diethylene glycol.

For the esterification, any catalyst is usually not employed. The catalyst for polycondensation is not limitative but preferably chosen from antimony compounds, germanium compounds and titanium compounds.

The esterification and/or the polycondensation may be carried out in the presence of a lubricant chosen from inorganic or organic fine particles.

As the magnesium compound, any magnesium compound soluble in the reaction system may be employed. Examples of the magnesium compound are magnesium hydride, magnesium alkanoates (e.g. magnesium acetate), magnesium alkoxides (e.g. magnesium methoxide), etc. The amount of the magnesium compound to be added to the reaction system may be usually from about 30 to 400 ppm, preferably from about 50 to 200 ppm, in terms of magnesium atom. When the amount is less than about 30 ppm, the specific resistance of the polyester is not sufficiently lowered and, as the result, the electrostatic adherence is not satisfactorily improved. When the amount exceeds about 400 ppm, any further improvement of the electrostatic adherence is not expected. In addition, the by-production of diethylene glycol is increased and the heat resistance of the produced polyester is deteriorated.

Addition of the magnesium compound to the reaction system is carried out at the stage that the esterification rate reaches to about 20-80%, preferably about 50-70%. When the addition is carried out at the stage that the esterification rate is less than about 20%, the filtrability of the oligomer is lowered, and the insoluble abnormalities in the oligomer can be hardly eliminated. When the addition takes place at the stage that the esterification rate exceeds about 80%, the by-production of diethylene glycol is increased, and the quality of the polyester as produced is deteriorated.

As the phosphorus compound, there may be used phosphoric acid, phosphorous acid, phosphonic acid, etc. and their derivatives. Specific examples are phosphoric acid, trimethyl phosphate, triethyl phosphate, tributyl phosphate, triphenyl phosphate, monomethyl phosphate, dimethyl phosphate, monobutyl phosphate, dibutyl phosphate, phosphorous acid, trimethyl phosphite, triethyl phosphite, tributyl phosphite, methylphosphonic acid, dimethyl methylphosphonate, dimethyl ethylphosphonate, dimethyl phenylphosphonate, diethyl phenylphosphonate, diphenyl phenylphosphonate, etc. These can be used either individually or in combination. The amount of the phosphorus compound to be added to the reaction system is, as shown by the equation (I), within a range of 1.2-20, preferably of 1.6-10, in terms of the atomic ratio of Mg/P. When the phosphorus compound is used in a smaller amount, the specific resistance is not sufficiently lowered, and the enhancement of the electrostatic adherence is not satisfactory. When employed in a larger amount, the electrostatic adherence is rather lowered with deterioration of the heat resistance and the coloring.

Addition of the phosphorus compound to the reaction system is carried out at the stage after the esterification rate reaches about 91% and before the initial condensation is terminated. When the addition is carried out before the esterification rate reaches about 91%, the electrostatic adherence is not sufficiently improved. In addition, the by-production of diethylene glycol increases, and the productivity of the polyester decreases. When the addition is carried out after the initial condensation is terminated, the phosphorus compound can not be homogeneously admixed with the polyester due to the high viscosity. In addition, there occurs the depolymerization of the oligomer, and the decrease of the productivity of the polyester and the increase of the by-production of diethylene glycol take place.

As the alkali metal compound, there may be employed any alkali metal compound soluble into the reaction system such as sodium or potassium carboxylates, phosphates, carbonates, hydrides and alkoxides. Specific examples are sodium acetate, potassium acetate, sodium benzoate, potassium benzoate, sodium dihydrogen phosphate, potassium dihydrogen phosphate, sodium pyrophosphate, potassium pyrophosphate, sodium tripolyphosphate, potassium tripolyphosphate, sodium hydrogen carbonate, potassium hydrogen carbonate, sodium hydride, potassium hydride, sodium methoxide, potassium methoxide, sodium ethoxide, potassium ethoxide, etc. Especially preferred are the carboxylates. These can be used either individually or in combination. The amount of the alkali metal compound to be added to the reaction system is, as shown by the equation (II), within a range of about 3.0 to 50 ppm, preferably of about 5.0 to 30 ppm, in terms of the alkali metal atom to the polyester as produced. When the amount of the alkali metal compound is less than about 3.0 ppm, the electrostatic adherence is insufficient and the by-production of diethylene glycol increases. When the amount exceeds 50 ppm, the electrostatic adherence is rather lowered, and the coarse particles are increased. In addition, the heat resistance is decreased, and the resin color is deteriorated.

Addition of the alkali metal compound may be carried out at any stage before the initial condensation is terminated. When the addition is carried out after the termination of the initial condensation, the alkali metal compound can not be homogeneously mixed due to the high viscosity of the reaction system. Further, the depolymerization of the oligomer takes place and the by-production of diethylene glycol increases so that the productivity is lowered.

The cobalt compound may be any cobalt compound soluble in the reaction system. Examples of the cobalt compound are cobalt aliphatic carboxylates (e.g. cobalt acetate), cobalt naphthenate, cobalt benzoate, cobalt chloride, cobalt acetylacetonate, etc. Especially preferred are cobalt lower aliphatic carboxylates. The amount of the cobalt compound to be added to the reaction system is, as shown by the equation (III), within a range of about 3.0 to 50 ppm in terms of the cobalt atom to the polyester as produced. By the addition of the cobalt compound in the said range, an excellent coloration of the polyester is obtainable. The optimum amount of the cobalt compound depends upon the purity of terephthalic acid, and a higher amount of the cobalt compound is to be used with a lower purity of terephthalic acid. In general, an amount of about 10–30 ppm is appropriate for terephthalic acid of high purity which contains less than about 25 ppm of 4-carboxybenzaldehyde, while an amount of about 30–40 ppm is suitable for terephthalic acid of low purity which contains about 200–800 ppm of 4-carboxybenzaldehyde. When the amount of the cobalt compound is less than about 3.0 ppm, the effect of improving the degree of whiteness of the polyester is not produced. When the amount exceeds about 50 ppm, the polyester is made reddish and deteriorates in heat resistance.

Addition of the cobalt compound may be carried out at any stage before the termination of the initial condensation. When the addition is made after such termination, the cobalt compound can not be homogeneously mixed due to the high viscosity of the reaction system. In addition, the depolymerization of the oligomer, the increase of the by-production of diethylene glycol and the lowering of the productivity will occur.

As the tertiary amine or quaternary ammonium salt, there may be employed aliphatic, alicyclic, aromatic or heterocyclic ones. Specific examples are triethylamine, tributylamine, dimethylbenzylamine, piperidine, dimethylaniline, pyridine, tetraethylammonium hydroxide, tetrabutylammonium hydroxide, triethylbenzylammonium hydroxide, etc. These may be used in either a free form or the form of a salt, for instance, with a lower aliphatic carboxylic acid or terephthalic acid. Also, these may be used either individually or in combination. Especially preferred are triethylamine, tetraethylammonium hydroxide and tetraethylammonium terephthalate. The amount of the tertiary amine and/or quaternary ammonium salt to be added to the reaction system is within a range of about 0.01 to 1 mol %, preferably about 0.05 to 0.5 mol % to the polyester as produced. An excellent electrostatic adherence is obtainable by the incorporation of such amount. When the amount is less than about 0.01 mol %, any material effect for enhancement of the electrostatic adherence is not produced. Further, the by-production of diethylene glcyol is notable. When the amount is more than about 1 mol %, the electrostatic adherence is rather lowered. In addition, the coarse particles increase and the resin color is deteriorated.

Addition of the tertiary amine and/or quaternary ammonium salt may be carried out at any stage before the initial condensation is terminated. When the addition is carried out after the termination of the initial condensation, the tertiary amine and/or quaternary ammonium salt can not be homogeneously mixed due to the high viscosity of the reaction system. In addition, there occur the depolymerization of the oligomer, the by-production of diethylene glycol and the lowering of the productivity.

The essential and optional additives as stated above may be introduced into the reaction system alone or in combination. Further, their introduction is usually carried out in a solid or liquid form, and particularly preferred is to introduce them as a solution in ethylene glycol. Furthermore, it is preferred to carry out the introduction while maintaining the reaction system at a temperature of about 230 to 290° C., especially of about 240 to 270° C. When the temperature is lower than about 230° C., the solidification of the oligomer takes place. When the temperature is higher than about 290° C., side reactions such as the by-production of ethylene glycol and the coloring are accelerated. Moreover, the introduction may be usually carried out while maintaining the reaction system under a presure of the atmospheric pressure to about 3 kg/cm$^2$, preferably of the atmospheric pressure to about 1 kg/cm$^2$. The introduction under a higher pressure than about 3 kg/cm$^2$ will unfavorably cause the increase of the by-production of diethylene glycol.

The polyesters obtained by the present invention are excellent in whiteness, transparency and clarity and therefore suitable for the use as films, containers, etc.

For better understanding of the present invention, detailed descriptions will be given by means of the following Examples, wherein part(s) are by weight unless otherwise stated.

The physical properties described in the Examples were determined by the following methods:

(1) Esterification rate:-

The amount of the carboxyl group remained in the reaction product and the saponification value of the reaction product were measured, and the esterification rate was calculated according to the following equation:

Esterification rate (%) =

$$\frac{\left(\begin{array}{c}\text{Saponification}\\\text{value}\end{array}\right) - \left(\begin{array}{c}\text{Amount of carboxyl}\\\text{group}\end{array}\right)}{\text{Saponification value}} \times 100$$

(2) Intrinsic viscosity:-

Measurement was made on a solution of the polymer in a mixed solvent of phenol and tetrachloroethane (6 : 4 by weight) at 30° C.

(3) Number of coarse particles in the polymer:-

A small amount of the polymer was placed between two glass plates and melt pressed at 280° C., followed by rapid cooling. The number of coarse particles in the polymer (number/2.4 mm$^2$) was counted under observation by a phasecontrast microscope.

(4) Specific resistance of the polymer in a melt state:-

Two electrode plates were immersed in the polymer in a melt state at 275° C., and an electric voltage of 120 V was supplied thereto. The electric current ($i_o$) was measured, and the specific resistance ($\rho_i$) was calculated according to the following equation:

$$\rho_i(\Omega \cdot cm) = \frac{A}{l} \times \frac{V}{i_o}$$

wherein A is the area of the electrode plates (cm$^2$), l is the distance between the electrode plates (cm) and V is the electric voltage (V).

(5) Electrostatic adherence:-

An electrode of tungesten wire was provided between the orifice of an extruder and the quenching drum, and an electric voltage of 10 to 15 V was supplied between the electrode and the quenching drum, during which casting was carried out. The surface of the obtained casting sheet was subjected to observation by naked eye. Evaluation was made on the casting speed (m/min) at which the occurrence of pinner bubble started. The polymer giving a larger casting speed is taken as better in electrostatic adherence.

(6) Color tone of the polymer:-

The color tone is expressed by the "b" value which was measured as one of the three elements (L, a and b) on the polymer in chips with the aid of a color-difference meter (manufactured by Nippon Denshoku K.K., Model ND-10). A smaller "b" value shows a higher whiteness and a better color tone.

(7) Film haze:-

The film haze (%) was determined by the use of a direct vision hazeometer (manufactured by Toyo Seiki K.K.).

(8) Heat resistance:-

The polymer was admitted in a glass ampoule under a nitrogen pressure of 100 mmHg, and the glass ampoule was sealed. After heating at 300° C. for 2 hours, the change of the intrinsic viscosity was measured. The heat resistance was expressed by the depression in intrinsic viscosity ($\Delta IV$). A smaller value of $\Delta IV$ represents a better heat resistance.

(9) Filtrability of the oligomer:-

The filtrability (ton/m$^2$) was expressed by the amount of the oligomer which could be passed through a filter with the elevation of a back pressure of not more than 3 kg/cm$^2$. Usually, the value of not less than 100 ton/m$^2$ is practical. A larger value is industrially advantageous, because the exchange frequency of the filter and the filtration area can be decreased.

EXAMPLE 1

A continuous esterification apparatus comprised two reactors connected in series, each reactor being equipped with an agitator, a partial condenser, material inlets and a product outlet. To the reaction system containing the esterification product in the first reactor, there was supplied continuously a slurry of terephthalic acid in ethylene glycol containing antimony trioxide through an inlet, the molar ratio of ethylene glycol to terephthalic acid being 1.7 and the content of antimony trioxide being 289 ppm in terms of antimony atom to terephthalic acid.

Simultaneously, a solution of magnesium acetate tetrahydrate in ethylene glycol was continuously supplied thereto through an inlet different from that for the slurry of terephthalic acid in ethylene glycol in an amount of 150 ppm in terms of magnesium atom to the polyester in the reaction mixture passing through the first reactor, and the reaction was effected at 255° C. under the atmospheric pressure with an average residence time of 4.5 hours. The reaction mixture was discharged continuously from the first reactor through the outlet and supplied to the second reactor through an inlet.

Through different inlets from the said inlet, ethylene glycol and a solution of trimethyl phosphate in ethylene glycol were supplied continuously into the second reactor respectively in amounts of 0.5 part by weight to 100 parts by weight of the polyester in the reaction mixture passing through the second reactor and of 106 ppm in terms of phosphorus atom (Mg/P=1.8) to the polyester in the reaction mixture passing through the second reactor. The reaction was further carried out at 260° C. under the atmospheric pressure with an average residence time of 5.0 hours. The esterification rates in the first reactor and in the second reactor were respectively 70% and 98%.

The esterification product was continuously passed through a stainless steel net filter of 600 mesh and supplied into a polycondensation apparatus comprising two reactors connected in series, each reactor being equipped with an agitator, a partial condenser, material inlets and a product outlet. The polycondensation was conducted to give a polyester of 0.620 in intrinsic viscosity.

The properties of the polyester thus obtained and of a film of 12 microns in thickness prepared by melt extruding the polyester at 290° C., stretching the extruded sheet at 90° C. in machine direction with a draw ratio of 3.5 and at 130° C. in transverse direction with a draw ratio of 3.5 and subjecting the stretched sheet to heat treatment at 220° C. are shown in Table 1.

The polyester obtained in this Example was excellent in electrostatic adherence and transparency. In addition, the oligomer showed a good filtrability.

COMPARATIVE EXAMPLE 1

In the same manner as in Example 1 but not using the ethylene glycol solution of magnesium acetate tetrahydrate and the ethylene glycol solution of trimethyl phosphate, the operation was carried out to give a polyester. The properties of the polyester thus obtained and a film of 12 microns in thickness prepared from such polyester by melt extrusion, stretching and heat treatment as in Example 1 are shown in Table 1.

The polyester obtained in this Comparative Example was excellent in transparency. Further, the oligomer showed a good filtrability. But, the electrostatic adherence of the polyester was extremely low.

COMPARATIVE EXAMPLE 2

In the same manner as in Example 1 but not using the ethylene glycol solution of trimethyl phosphate, the operation was carried out to give a polyester. The properties of the polyester thus obtained and a film of 12 microns in thickness prepared from such polyester by melt extrusion, stretching and heat treatment as in Example 1 are shown in Table 1.

The polyester obtained in this Comparative Example was good in electrostatic adherence. Further, the oligomer showed a good filtrability. But, the transparency and the heat resistance are poor.

EXAMPLE 2

A continuous esterification apparatus comprised two reactors connected in series, each reactor being equipped with an agitator, a partial condenser, material inlets and a product outlet. To the reaction system containing the esterification product in the first reactor, there was supplied continuously a slurry of terephthalic acid in ethylene glycol containing antimony trioxide through an inlet, the molar ratio of ethylene glycol to terephthalic acid being 1.7 and the content of antimony trioxide being 289 ppm in terms of antimony atom to terephthalic acid.

Simultaneously, a solution of magnesium acetate tetrahydrate in ethylene glycol and a solution of sodium acetate in ethylene glycol were continuously supplied through inlets different from that for the slurry of terephthalic acid in ethylene glycol in amounts of 100 ppm in terms of magnesium atom and 10 ppm in terms of sodium atom, respectively, to the polyester in the reaction mixture passing though the first reactor, and the reaction was effected at 255° C. under the atmospheric pressure with an average residence time of 4.5 hours. The reaction mixture was discharged continuously from the frist reactor and supplied to the second reactor through an inlet.

Through different inlets from the said inlet, ethylene glycol and a solution of trimethyl phosphate in ethylene glycol were supplied continuously into the second reactor respectively in amounts of 0.5 part by weight to 100 parts by weight of the polyester in the reaction mixture passing through the second reactor and of 64 ppm in terms of phosphorus atom to the polyester in the reaction mixture passing through the second reactor. The reaction was further carried out at 260° C. under the atmospheric pressure with an average residence time of 5.0 hours. The esterification rates in the first reactor and in the second reactor were respectively 70% and 98%.

The esterified product was continuously passed through a stainless steel net filter of 600 mesh and supplied into a polycondensation apparatus comprising two reactors connected in series, each reactor being equipped with an agitator, a partial condenser, material inlets and a product outlet. The polycondensation was conducted to give a polyester of 0.620 in intrinsic viscosity.

The properties of the polyester thus obtained and a film of 12 microns in thickness prepared by melt extruding the said polyester at 290° C., stretching the extruded sheet at 90° C. in machine direction with a draw ratio of 3.5 and at 130° C. in transverse direction with a draw ratio of 3.5 and subjecting the stretched sheet to heat treatment at 220° C. are shown in Table 2.

It is clear from Table 2 that the polyester obtained in this Example was excellent in electrostatic adherence, transparency and heat resistance. Further, it contained coarse particles and diethylene glycol only in low contents. In addition, the oligomer showed a good filtrability. Accordingly, the polyester is of high quality and gives good operation efficiency.

EXAMPLES 3 to 10

In the same manner as in Example 2 but varying the kinds and amounts of the phosphorus compound and the alkali metal compound as well as the incorporation stage of the alkali metal compound, the operation was carried out to give a polyester. The properties of the polyester thus obtained and a film of 12 microns in thickness prepared from such polyester by melt extrusion, stretching and heat treatment as in Example 2 are shown in Table 2.

It is clear that the polyesters obtained in these Examples were excellent in electrostatic adherence, transparency and heat resistance and contained coarse particles and diethylene glycol only in low contents. In addition, the oligomer showed a good filtrability.

COMPARATIVE EXAMPLE 3

In the same manner as in Example 2 but not using the ethylene glycol solution of magnesium acetate tetrahydrate and the ethylene glycol solution of trimethyl phosphate, the operation was carried out to give a polyester. The properties of the polyester thus obtained and a film of 12 microns in thickness prepared from such polyester by melt extrusion, stretching and heat treatment as in Example 2 are shown in Table 2.

The polyester obtained in this Comparative Example was good in transparency and heat resistance. Further, the content of diethylene glycol was small. In addition, the filtrability of the oligomer was good. However, the electrostatic adherence was extremely bad.

COMPARATIVE EXAMPLE 4

In the same manner as in Example 2 but incorporating the ethylene glycol solution of magnesium acetate tetrahydrate and the ethylene glycol solution of sodium acetate into the reaction system not at the first reactor but at the second reactor, the operation was carried out to give a polyester. The properties of the polyester thus obtained and a film of 12 microns in thickness prepared from such polyester by melt extrusion, stretching and heat treatment as in Example 2 are shown in Table 2.

The polyester obtained in this Comparative Example was good in electrostatic adherence, transparency and heat resistance. However, the oligomer was extremely bad in filtrability. Further, the polyester had a high content of diethylene glycol.

COMPARATIVE EXAMPLE 5

In the same manner as in Example 2 but incorporating the ethylene glycol solution of magnesium acetate tetrahydrate and the ethylene glycol solution of sodium acetate into the reaction system by adding them to the ethylene glycol slurry of terephthalic acid, the operation was carried out to give a polyester. The properties of the polyester thus obtained and a film of 12 microns in thickness prepared from such polyester by melt extrusion, stretching and heat treatment as in Example 2 are shown in Table 2.

The polyester obtained in this Comparative Example was good in transparency and heat resistance and contained diethylene glycol only in a small content. However, the oligomer was extremely bad in filtrability. Further, the polyester was bad in electrostatic adherence.

COMPARATIVE EXAMPLE 6

In the same manner as in Example 2 but incorporating the ethylene glycol solution of trimethyl phosphate into the reaction system not at the second reactor but at the first reactor, the operation was carried out to give a polyester. The properties of the polyester thus obtained and a film of 12 microns in thickness prepared from such polyester by melt extrusion, stretching and heat treatment as in Example 2 are shown in Table 2.

The polyester obtained in this Comparative Example was good in transparency and heat resistance. Further, the oligomer showed a good filtrability. However, the electrostatic adherence was bad, and the diethylene glycol content was high. Since the polymerization activity decreased, the polymerization temperature was forced to make higher for obtaining a polyester of 0.620 in intrinsic viscosity.

COMPARATIVE EXAMPLE 7

In the same manner as in Example 2 but increasing the amount of the ethylene glycol solution of trimethyl phosphate to 129 ppm in terms of phosphorus atom and making the Mg/P ratio to 1.0, the operation was carried out to give a polyester. The properties of the polyester thus obtained and a film of 12 microns in thickness prepared from such polyester by melt extrusion, stretching and heat treatment as in Example 2 are shown in Table 2.

The polyester obtained in this Comparative Example was good in transparency and heat resistance and contained diethylene glycol only in a small content. Further, the oligomer showed a good filtrability. However, the electrostatic adherence was extremely bad.

COMPARATIVE EXAMPLE 8

In the same manner as in Example 2 but increasing the amount of the ethylene glycol solution of sodium acetate to 100 ppm in terms of sodium atom, the operation was carried out to give a polyester. The properties of the polyester thus obtained and a film of 12 microns in thickness prepared from such polyester by melt extrusion, stretching and heat treatment as in Example 2 are shown in Table 2.

The polyester obtained in this Comparative Example contained diethylene glycol only in a small content, and the oligomer showed a good filtrability. However, the polyester was inferior in electrostatic adherence, transparency and heat resistance.

EXAMPLE 11

In the same manner as in Example 1 but supplying continuously a solution of cobalt acetate tetrahydrate in ethylene glycol into the first reactor to keep a concentration of 20 ppm in terms of Co atom to the polyester in the reaction mixture passing through the first reactor, the operation was carried out to give a polyester. The properties of the polyester thus obtained and a film of 12 microns in thickness prepared from such polyester by melt extrusion, stretching and heat treatment as in Example 1 are shown in Table 3.

The polyester obtained in this Example was excellent in electrostatic adherence, transparency and whiteness. Further, the oligomer showed a good filtrability.

EXAMPLES 12 AND 13

In the same manner as in Example 11 but varying the amount of magnesium acetate tetrahydrate, the kind of the phosphorus compound and the amount and supply stage of cobalt acetate tetrahydrate, the operation was carried out to give a polyester. The properties of the polyester thus obtained and a film of 12 microns in thickness prepared from such polyester by melt extrusion, stretching and heat treatment as in Example 11 are shown in Table 3.

The polyesters obtained in these Examples were good in electrostatic adherence, transparency and color tone. The oligomer showed a good filtrability.

COMPARATIVE EXAMPLE 9

In the same manner as in Example 11 but not using the ethylene glycol solution of magnesium acetate tetrahydrate and the ethylene glycol solution of trimethyl phosphate, the operation was carried out to give a polyester. The properties of the polyester thus obtained and a film of 12 microns in thickness prepared from such polyester by melt extrusion, stretching and heat treatment as in Example 11 are shown in Table 3.

The polyester obtained in this Comparative Example was good in transparency, whiteness and heat resistance. Further, the filtrability of the oligomer was good. However, the electrostatic adherence was extremely bad.

COMPARATIVE EXAMPLE 10

In the same manner as in Example 11 but supplying the ethylene glycol solution of magnesium acetate tetrahydrate and the ethylene glycol solution of cobalt acetate into the reaction system not at the first reactor but at the second reactor, the operation was carried out to give a polyester. The properties of the polyester thus obtained and a film of 12 microns in thickness prepared from such polyester by melt extrusion, stretching and heat treatment as in Example 11 are shown in Table 3.

The polyester obtained in this Comparative Example was good in electrostatic adherence, transparency and color tone. However, the oligomer was extremely bad in filtrability.

COMPARATIVE EXAMPLE 11

In the same manner as in Example 11 but increasing the amount of the ethylene glycol solution of trimethyl phosphate to 191 ppm in terms of phosphorus atom and making the Mg/P ratio to 1.0, the ethylene glycol of magnesium acetate tetrahydrate and the ethylene glycol of trimethyl phosphate, the operation was carried out to give a polyester. The properties of the polyester thus obtained and a film of 12 microns in thickness prepared from such polyester by melt extrusion, stretching and heat treatment as in Example 11 are shown in Table 3.

The polyester obtained in this Comparative Example was good in transparency and color tone. Further, the filtrability of the oligomer was good. However, the electrostatic adherence was bad.

COMPARATIVE EXAMPLE 12

In the same manner as in Example 11 but not using the ethylene glycol solution of magnesium acetate tetrahydrate, the operation was carried out to give a polyester. The properties of the polyester thus obtained and a film of 12 microns in thickness prepared from such polyester by melt extrusion, stretching and heat treatment as in Example 11 are shown in Table 3.

The polyester obtained in this Comparative Example was good in transparency and color tone. Further, the oligomer showed a bood filtrability. However, the electrostatic adherence was bad.

EXAMPLE 14

A continuous esterification apparatus comprised two reactors connected in series, each reactor being equipped with an agitator, a partial condenser, material inlets and a product outlet. To the reaction system containing the esterification product in the first reactor, there was supplied continuously a slurry of terephthalic acid in ethylene glycol containing antimony trioxide through an inlet, the molar ratio of ethylene glycol to terephthalic acid being 1.7 and the content of antimony trioxide being 289 ppm in terms of antimony atom to terephthalic acid.

Simultaneously, a solution of magnesium acetate tetrahydrate in ethylene glycol, a solution of sodium acetate in ethylene glycol and a solution of cobalt acetate tetrahydrate in ethylene glycol were continuously supplied through inlets different from that for the slurry of terephthalic acid in ethylene glycol in amounts of 100 ppm in terms of magnesium atom, 10 ppm in terms of sodium atom and 20 ppm in terms of cobalt atom, respectively, to the polyester in the reaction mixture passing though the first reactor, and the reaction was effected at 255° C. under the atmospheric pressure with an average residence time of 4.5 hours. The reaction mixture was discharged continuously from the frist reactor and supplied to the second reactor through an inlet.

Through different inlets from the said inlet, ethylene glycol and a solution of trimethyl phosphate in ethylene glycol were supplied continuously into the second reactor respectively in amounts of 0.5 part by weight to 100 parts by weight of the polyester in the reaction mixture passing through the second reactor and of 64 ppm in terms of phosphorus atom to the polyester in the reaction mixture passing through the second reactor. The reaction was further carried out at 260° C. under the atmospheric pressure with an average residence time of 5.0 hours. The esterification rates in the first reactor and in the second reactor were respectively 70% and 98%.

The esterified product was continuously passed through a stainless steel net filter of 600 mesh and supplied into a polycondensation apparatus comprising two reactors connected in series, each reactor being equipped with an agitator, a partial condenser, material inlets and a product outlet. The polycondensation was conducted to give a polyester of 0.620 in intrinsic viscosity.

The properties of the polyester thus obtained and a film of 12 microns in thickness prepared by melt extruding the said polyester at 290° C., stretching the extruded sheet at 90° C. in machine direction with a draw ratio of 3.5 and at 130° C. in transverse direction with a draw ratio of 3.5 and subjecting the stretched sheet to heat treatment at 220° C. are shown in Table 4.

It is clear from Table 4 that the polyester obtained in this Exmple was excellent in electrostatic adherence, transparency, whiteness and heat resistance. Further, it contained coarse particles and diethylene glycol only in low contents. In addition, the oligomer showed a good filtrability. Accordingly, the polyester is of high quality and gives good operation efficiency.

EXAMPLES 15 TO 21

In the same manner as in Example 14 but varying the kinds and amounts of the phosphorus compound and the alkali metal compound, the supply stage of the alkali metal compound and the amount and supply stage of cobalt acetate tetrahydrate, the operation was carried out to give a polyester. The properties of the polyester thus obtained and a film of 12 microns in thickness prepared from such polyester by melt extrusion, stretching and heat treatment as in Example 14 are shown in Table 4.

The polyesters obtained in these Examples were excellent in electrostatic adherence, transparency, whiteness and heat resistance and contained coarse particles and diethylene glycol only in low contents. In addition, the oligomer showed a good filtrability.

COMPARATIVE EXAMPLE 13

In the same manner as in Example 14 but supplying the ethylene glycol of magnesium acetate tetrahydrate and the ethylene glycol of sodium acetate to the reaction system not at the first reactor but at the second reactor, the operation was carried out to give a polyester. The properties of the polyester thus obtained and a film of 12 microns in thickness prepared from such polyester by melt extrusion, stretching and heat treatment as in Example 14 are shown in Table 4.

The polyester obtained in this Comparative Example was good in electrostatic adherence, transparency, whiteness and heat resistance. However, the content of diethylene glycol was high. In addition, the filtrability of the oligomer was extremely bad.

COMPARATIVE EXAMPLE 14

In the same manner as in Example 14 but supplying the ethylene glycol solution of magnesium acetate tetrahydrate, the ethylene glycol solution of sodium acetate and the ethylene glycol solution of cobalt acetate tetrahydrate to the reaction system by adding them to the ethylene glycol slurry of terephthalic acid, the operation was carried out to give a polyester. The properties of the polyester thus obtained and a film of 12 microns in thickness prepared from such polyester by melt extrusion, stretching and heat treatment as in Example 14 are shown in Table 4.

The polyester obtained in this Comparative Example was good in transparency, whiteness and heat resistance. Further, the diethylene glycol content was small. However, the electrostatic adherence was not good, and the oligomer was bad in filtrability.

COMPARATIVE EXAMPLE 15

In the same manner as in Example 14 but supplying the ethylene glycol solution of trimethyl phosphate to the reaction system not at the second reactor but at the first reactor, the operation was carried out to give a polyester. The properties of the polyester thus obtained and a film of 12 microns in thickness prepared from such polyester by melt extrusion, stretching and heat treatment as in Example 14 are shown in Table 4.

The polyester obtained in this Comparative Example was good in transparency, whiteness and heat resistance. Further, the oligomer showed a good filtrability. However, the electrostatic adherence was bad, and the diethylene glycol content was high. Since the polymerization activity was lowered, a higher polymerization temperature was needed for obtaining a polyester of 0.620 in intrinsic viscocisty.

COMPARATIVE EXAMPLE 16

In the same manner as in Example 14 but increasing the amount of the ethylene glycol solution of trimethyl phosphate to 129 ppm in terms of phosphorus atom and making the Mg/P ratio to 1.0, the operation was carried out to give a polyester. The properties of the polyester thus obtained and a film of 12 microns in thickness prepared from such polyester by melt extrusion, stretching and heat treatment as in Example 14 are shown in Table 4.

The polyester obtained in this Comparative Example was good in transparency, whiteness and heat resistance. Further, the diethylene glycol content was low, and the oligomer was good in filtrability. However, the electrostatic adherence was extremely bad.

COMPARATIVE EXAMPLE 17

In the same manner as in Example 14 but increasing the amount of the ethylene glycol solution of sodium acetate to 100 ppm in terms of sodium atom, the operation was carried out to give a polyester. The properties of the polyester thus obtained and a film of 12 microns in thickness prepared from such polyester by melt extrusion, stretching and heat treatment as in Example 14 are shown in Table 4.

The polyester obtained in this Comparative Example contained diethylene glycol only in a small content, and the oligomer showed a good filtrability. However, the polyester was inferior in transparency, whiteness, heat resistance and electrostatic adherence.

COMPARATIVE EXAMPLE 18

In the same manner as in Example 14 but increasing the ethylene glycol solution of cobalt acetate tetrahydrate to 100 ppm in terms of cobalt atom, the operation was carried out to give a polyester. The properties of the polyester thus obtained and a film of 12 microns in thickness prepared from such polyester by melt extrusion, stretching and heat treatment as in Example 14 are shown in Table 4.

The polyester obtained in this Comparative Example contained diethylene glycol only in a small content. The filtrability of the oligomer was good. However, the polyester was inferior in transparency, heat resistance and color tone. In addition, the electrostatic adherence was bad.

EXAMPLE 22

A continuous esterification apparatus comprised two reactors connected in series, each reactor being equipped with an agitator, a partial condenser, material inlets and a product outlet. To the reaction system containing the esterification product in the first reactor, there was supplied continuously a slurry of terephthalic acid in ethylene glycol containing antimony trioxide through an inlet, the molar ratio of ethylene glycol to terephthalic acid being 1.7 and the content of antimony trioxide being 289 ppm in terms of antimony atom to terephthalic acid.

Simultaneously, a solution of magnesium acetate tetrahydrate in ethylene glycol and a solution of triethylamine in ethylene glycol were continuously supplied through inlets different from that for the slurry of terephthalic acid in ethylene glycol in amounts of 100 ppm in terms of magnesium atom and of 0.1 mol %, respectively, to the polyester in the reaction mixture passing though the first reactor, and the reaction was effected at 255° C. under the atmospheric pressure with an average residence time of 4.5 hours. The reaction mixture was discharged continuously from the frist reactor and supplied to the second reactor through an inlet.

Through different inlets from the said inlet, ethylene glycol and a solution of trimethyl phosphate in ethylene glycol were supplied continuously into the second reactor respectively in amounts of 0.5 part by weight to 100 parts by weight of the polyester in the reaction mixture passing through the second reactor and of 64 ppm in terms of phosphorus atom to the polyester in the reaction mixture passing through the second reactor. The reaction was further carried out at 260° C. under the atmospheric pressure with an average residence time of 5.0 hours. The esterification rates in the first reactor and in the second reactor were respectively 70% and 98%.

The esterified product was continuously passed through a stainless steel net filter of 600 mesh and supplied into a polycondensation apparatus comprising two reactors connected in series, each reactor being equipped with an agitator, a partial condenser, material inlets and a product outlet. The polycondensation was conducted to give a polyester of 0.620 in intrinsic viscosity.

The properties of the polyester thus obtained and a film of 12 microns in thickness prepared by melt extruding the said polyester at 290° C., stretching the extruded sheet at 90° C. in machine direction with a draw ratio of 3.5 and at 130° C. in transverse direction with a draw ratio of 3.5 and subjecting the stretched sheet to heat treatment at 220° C. are shown in Table 5.

It is clear from Table 5 that the polyester obtained in this Example was excellent in electrostatic adherence, transparency and heat resistance. Further, it contained coarse particles and diethylene glycol only in low contents. In addition, the oligomer showed a good filtrability. Accordingly, the polyester is of high quality and gives good operation efficiency.

EXAMPLES 23 TO 28

In the same manner as in Example 22 but varying the kinds and amounts of the phosphorus compound and the tertiary amines or quaternary ammonium salts, and the supply stage of triethylamine, the operation was carried out to give a polyester. The properties of the polyester thus obtained and of a film of 12 microns in thickness prepared from such polyester by melt extrusion, stretching and heat treatment as in Example 22 are shown in Table 5.

The polyesters obtained in these Examples were excellent in electrostatic adherence, transparency and heat resistance and contained coarse particles and diethylene glycol only in low contents. In addition, the oligomer showed a good filtrability.

COMPARATIVE EXAMPLE 19

In the same manner as in Example 22 but not supplying the ethylene glycol of magnesium acetate tetrahydrate and the ethylene glycol solution of trimethyl phosphate to the reaction system, the operation was carried out to give a polyester. The properties of the polyester thus obtained and a film of 12 microns in thickness prepared from such polyester by melt extrusion, stretching and heat treatment as in Example 22 are shown in Table 5.

The polyester obtained in this Comparative Example was good in transparency and heat resistance and contained diethylene glycol only in a small amount. Further, the oligomer was good in filtrability. However, the electrostatic adhereince was extremely bad.

COMPARATIVE EXAMPLE 20

In the same manner as in Example 22 but supplying the ethylene glycol solution of magnesium acetate tetrahydrate and the ethylene glycol solution of triethylamine to the reaction system not at the first reactor but at the second reactor, the operation was carried out to give a polyester. The properties of the polyester thus obtained and a film of 12 microns in thickness prepared from such polyester by melt extrusion, stretching and heat treatment as in Example 22 are shown in Table 5.

The polyester obtained in this Comparative Example was good in electrostatic adherence, transparency and heat resistance. However, the oligomer showed an extremely bad filtrability. Further, the diethylene glycol content was high.

COMPARATIVE EXAMPLE 21

In the same manner as in Example 22 but supplying the ethylene glycol solution of trimethyl phosphate to the reaction system not at the second reactor but at the first reactor, the operation was carried out to give a polyester. The properties of the polyester thus obtained and a film of 12 microns in thickness prepared from such polyester by melt extrusion, stretching and heat treatment as in Example 22 are shown in Table 5.

The polyester obtained in this Comparative Example was good in transparency and heat resistance. Further, the oligomer showed a good filtrability. However, the electrostatic adherence was bad, and the diethylene glycol content was high. Since the polymerization activity was lowered, a higher polymerization temperature was needed for obtaining a polyester of 0.620 in intrinsic viscocisty.

COMPARATIVE EXAMPLE 22

In the same manner as in Example 22 but increasing the amount of the ethylene glycol solution of trimethyl phosphate to 129 ppm in terms of phosphorus atom and making the Mg/P ratio to 1.0, the operation was carried out to give a polyester. The properties of the polyester thus obtained and a film of 12 microns in thickness prepared from such polyester by melt extrusion, stretching and heat treatment as in Example 22 are shown in Table 5.

The polyester obtained in this Comparative Example was good in transparency and heat resistance. Further, the diethylene glycol content was low, and the oligomer was good in filtrability. However, the electrostatic adherence was extremely bad.

COMPARATIVE EXAMPLE 23

In the same manner as in Example 22 but increasing the amount of the ethylene glycol solution of triethylamine to 3 mol %, the operation was carried out to give a polyester. The properties of the polyester thus obtained and a film of 12 microns in thickness prepared from such polyester by melt extrusion, stretching and heat treatment as in Example 22 are shown in Table 5.

The polyester obtained in this Comparative Example was good in transparency and heat resistance and contained diethylene glycol only in a small content. The oligomer showed a good filtrability. However, the polyester was inferior in electrostatic adherence. Further, the degree of yellow was remarkably high.

TABLE 1

| Example | Magnesium acetate Amount (ppm) | Magnesium acetate Stage added* | Phosphorous compound Kind | Phosphorous compound Amount (ppm) | Phosphorous compound Stage added* | Mg/P (atomic ratio) | Electrostatic adherence (maximum casting speed) (m/min) | Heat resistance (Δ IV) | Number of coarce particles (not less than 5μ) (number/2.4 mm²) | Film haze (%) | Filtrability (ton/m²) |
|---|---|---|---|---|---|---|---|---|---|---|---|
| 1 | 150 | A | Trimethylphosphate | 106 | B | 1.8 | 50 | 0.130 | 0 | 0.1 | >150 |
| Comparative | | | | | | | | | | | |
| 1 | — | — | — | — | — | — | 20 | 0.111 | 0 | 0.1 | >150 |
| 2 | 150 | A | — | — | — | — | 50 | 0.211 | 10 | 0.3 | >100 |

Note:
*A: first reactor; B: second reactor.

TABLE 2

| Example | Magnesium acetate Amount (ppm) | Magnesium acetate Stage added* | Phosphorus compound Kind | Phosphorus compound Amount (ppm) | Phosphorus compound Stage added* | Mg/P (atomic ratio) | Alkali metal compound Kind | Alkali metal compound Amount (ppm) | Alkali metal compound Stage added* |
|---|---|---|---|---|---|---|---|---|---|
| 2 | 100 | A | Trimethylphosphate | 64 | B | 2.0 | Sodium acetate | 10 | A |
| 3 | 100 | A | Trimethylphosphate | 64 | B | 2.0 | Sodium acetate | 10 | B |
| 4 | 100 | A | Trimethylphosphate | 64 | B | 2.0 | Sodium acetate | 10 | C |
| 5 | 100 | A | Trimethylphosphate | 64 | B | 2.0 | Sodium acetate | 30 | A |
| 6 | 100 | A | Methylamidophosphate | 64 | B | 2.0 | Sodium acetate | 10 | A |
| 7 | 150 | A | Phosphoric acid | 98 | B | 2.0 | Sodium acetate | 30 | A |
| 8 | 100 | A | Tributylphosphate | 43 | B | 3.0 | Sodium acetate | 10 | A |
| 9 | 100 | A | Trimethylphosphate | 64 | B | 2.0 | Sodium dihydrogen phosphate | 5 | B |
| 10 | 100 | A | Trimethylphosphate | 64 | B | 2.0 | Potassium acetate | 10 | B |
| Comparative | | | | | | | | | |
| 3 | — | — | — | — | — | — | sodium acetate | 10 | A |
| 4 | 100 | B | Trimethylphosphate | 64 | B | 2.0 | Sodium acetate | 10 | B |
| 5 | 100 | C | Trimethylphosphate | 64 | B | 2.0 | Sodium acetate | 10 | C |
| 6 | 100 | A | Trimethylphosphate | 64 | A | 2.0 | Sodium acetate | 10 | A |

TABLE 2-continued

| | | | | | | | | | |
|---|---|---|---|---|---|---|---|---|---|
| 7 | 100 | A | Trimethylphosphate | 129 | B | 1.0 | Sodium acetate | 10 | A |
| 8 | 100 | A | Trimethylphosphate | 64 | B | 2.0 | Sodium acetate | 100 | A |

| Example | Specific resistance ($\times 10^8 \cdot \Omega$cm) | Electrostatic adherence (maximum casting speed) (m/min) | Content of diethylene glycol (mol %) | Heat resistance ($\Delta$ IV) | Number of coarse particle (not less than 5$\mu$) (number/2.4 mm$^2$) | Film haze (%) | Filtrability of oligomer (ton/m$^2$) |
|---|---|---|---|---|---|---|---|
| 2 | 0.12 | 55 | 1.8 | 0.120 | 0 | 0.1 | >150 |
| 3 | 0.13 | 55 | 1.9 | 0.121 | 0 | 0.1 | >150 |
| 4 | 0.12 | 55 | 1.7 | 0.123 | 0 | 0.1 | >150 |
| 5 | 0.08 | >55 | 1.7 | 0.123 | 0 | 0.1 | >150 |
| 6 | 0.13 | 55 | 1.7 | 0.121 | 0 | 0.1 | >150 |
| 7 | 0.07 | >55 | 1.9 | 0.127 | 0 | 0.1 | >150 |
| 8 | 0.09 | >55 | 1.8 | 0.125 | 0 | 0 | >150 |
| 9 | 0.17 | 53 | 1.9 | 0.120 | 0 | 0 | >150 |
| 10 | 0.11 | 55 | 1.8 | 0.121 | 0 | 0 | >150 |
| Comparative | | | | | | | |
| 3 | 1.5 | 25 | 1.5 | 0.115 | 0 | 0.1 | >100 |
| 4 | 0.17 | 53 | 2.7 | 0.122 | 0 | 0.1 | 22 |
| 5 | 0.30 | 42 | 1.5 | 0.118 | 3 | 0.1 | 57 |
| 6 | 0.35 | 40 | 2.5 | 0.123 | 1 | 0.1 | >100 |
| 7 | 0.70 | 33 | 1.7 | 0.105 | 0 | 0.1 | >100 |
| 8 | 0.50 | 37 | 1.7 | 0.132 | 27 | 0.4 | >100 |

Note:
*A: first reaction vessel; B: second reaction vessel; C: slurry of terephthalic acid and ethylene glycol.

TABLE 3

| Example | Magnesium acetate Amount (ppm) | Magnesium acetate Stage added* | Phosphorus compound Kind | Phosphorus compound Amount (ppm) | Phosphorus compound Stage added* | Mg/P (atomic ratio) | Cobalt acetate Amount (ppm) | Cobalt acetate Stage added* | Electrostatic adherence (maximum casting speed) (m/min) | Color tone (b value) | Film haze (%) | Filtrability (ton/m$^2$) |
|---|---|---|---|---|---|---|---|---|---|---|---|---|
| 11 | 150 | A | Trimethylphosphate | 106 | B | 1.8 | 20 | A | 50 | 1.0 | 0.1 | >150 |
| 12 | 150 | A | Phosphoric acid | 76 | B | 2.5 | 20 | C | 51 | 1.5 | 0.1 | >150 |
| 13 | 120 | A | Tributylphosphate | 76 | B | 2.0 | 10 | B | 48 | 2.0 | 0.1 | >150 |
| Comparative | | | | | | | | | | | | |
| 9 | — | — | — | — | — | — | 20 | A | 20 | 0.5 | 0.1 | >100 |
| 10 | 150 | B | Trimethylphosphate | 106 | B | 1.8 | 20 | B | 50 | 1.1 | 0.1 | 22 |
| 11 | 150 | A | Trimethylphosphate | 191 | B | 1.0 | 20 | A | 30 | 0.9 | 0.1 | >100 |
| 12 | — | — | Trimethylphosphate | 106 | B | — | 20 | A | 20 | 0.5 | 0.1 | >100 |

Note:
A: first reactor; B: second reactor; C: slurry of terephthalic acid and ethylene glycol.

TABLE 4

| Example | Magnesium acetate Amount (ppm) | Magnesium acetate Stage added* | Phosphorus compound Kind | Phosphorus compound Amount (ppm) | Phosphorus compound Stage added* | Mg/P (atomic ratio) | Alkali metal compound Kind | Alkali metal compound Amount (ppm) | Alkali metal compound Stage added* | Cobalt acetate Amount (ppm) | Cobalt acetate Stage added* |
|---|---|---|---|---|---|---|---|---|---|---|---|
| 14 | 100 | A | Trimethylphosphate | 64 | B | 2.0 | Sodium acetate | 10 | A | 20 | A |
| 15 | 100 | A | Trimethylphosphate | 64 | B | 2.0 | Sodium acetate | 10 | B | 20 | B |
| 16 | 100 | A | Trimethylphosphate | 64 | B | 2.0 | Sodium acetate | 10 | C | 20 | C |
| 17 | 100 | A | Trimethylphosphate | 64 | B | 2.0 | Sodium acetate | 30 | A | 30 | A |
| 18 | 100 | A | Methylphosphoric acid | 64 | B | 2.0 | Sodium acetate | 10 | A | 20 | A |
| 19 | 100 | A | Phosphoric acid | 43 | B | 3.0 | Sodium acetate | 10 | A | 20 | A |
| 20 | 100 | A | Trimethylphosphate | 64 | B | 2.0 | Sodium dihydrogen phosphate | 5 | A | 20 | A |
| 21 | 100 | A | Trimethylphosphate | 64 | B | 2.0 | Potassium acetate | 10 | A | 25 | A |
| Comparative | | | | | | | | | | | |
| 13 | 100 | B | Trimethylphosphate | 64 | B | 2.0 | Sodium acetate | 10 | B | 20 | A |
| 14 | 100 | C | Trimethylphosphate | 64 | B | 2.0 | Sodium acetate | 10 | C | 20 | C |
| 15 | 100 | A | Trimethylphosphate | 64 | A | 2.0 | Sodium acetate | 10 | A | 20 | A |
| 16 | 100 | A | Trimethylphosphate | 129 | B | 1.0 | Sodium acetate | 10 | A | 20 | A |
| 17 | 100 | A | Trimethylphosphate | 64 | B | 2.0 | Sodium acetate | 100 | A | 20 | A |
| 18 | 100 | A | Trimethylphosphate | 64 | B | 2.0 | Sodium acetate | 10 | A | 100 | A |

TABLE 4-continued

| Example | Specific resistance ($\times 10^8 \cdot \Omega$cm) | Electrostatic adherence (maximum casting speed) (m/min) | Color tone (b value) | Content of diethylene glycol (mol %) | Heat resistance ($\Delta$ IV) | Number of coarce particle (not less than 5μ) (number/2.4 mm²) | Film haze (%) | Filtrability of oligomer (ton/m²) |
|---|---|---|---|---|---|---|---|---|
| 14 | 0.13 | 55 | 1.2 | 1.7 | 0.125 | 1 | 0.1 | >150 |
| 15 | 0.12 | 55 | 1.2 | 1.9 | 0.123 | 0 | 0.1 | >150 |
| 16 | 0.13 | 55 | 1.1 | 1.8 | 0.122 | 0 | 0.1 | >150 |
| 17 | 0.08 | >55 | 0.8 | 1.7 | 0.125 | 1 | 0.1 | >150 |
| 18 | 0.13 | 55 | 1.2 | 1.7 | 0.123 | 0 | 0.1 | >150 |
| 19 | 0.09 | >55 | 1.5 | 1.8 | 0.130 | 0 | 0.1 | >150 |
| 20 | 0.15 | 53 | 1.2 | 1.9 | 0.123 | 0 | 0.1 | >150 |
| 21 | 0.12 | 55 | 1.5 | 1.8 | 0.123 | 0 | 0.1 | >150 |
| Comparative | | | | | | | | |
| 13 | 0.17 | 53 | 1.3 | 2.7 | 0.127 | 0 | 0.1 | 25 |
| 14 | 0.31 | 42 | 1.1 | 1.5 | 0.125 | 3 | 0.1 | 55 |
| 15 | 0.35 | 40 | 1.5 | 2.4 | 0.127 | 5 | 0.1 | >100 |
| 16 | 0.65 | 34 | 0.8 | 1.7 | 0.110 | 0 | 0.1 | >100 |
| 17 | 0.52 | 37 | 2.5 | 1.7 | 0.135 | 27 | 0.4 | >100 |
| 18 | 0.20 | 47 | 0.2 | 20 | 0.159 | 20 | 0.3 | >100 |

Note:
*A: first reaction vessel; B: second reaction vessel; C: slurry of terephthalic acid and ethylene glycol.

TABLE 5

| Example | Magnesium acetate Amount (ppm) | Magnesium acetate Stage added* | Phosphorus compound Kind | Phosphorus compound Amount (ppm) | Phosphorus compound Stage added* | Mg/P (atomic ratio) | Tertiary amine or quaternary ammonium salt Kind | Tertiary amine or quaternary ammonium salt Amount (ppm) | Tertiary amine or quaternary ammonium salt Stage added* |
|---|---|---|---|---|---|---|---|---|---|
| 22 | 100 | A | Trimethylphosphate | 64 | B | 2.0 | Triethylamine | 0.1 | A |
| 23 | 100 | A | Trimethylphosphate | 64 | B | 2.0 | Triethylamine | 0.3 | B |
| 24 | 100 | A | Trimethylphosphate | 64 | B | 2.0 | Triethylamine | 0.3 | C |
| 25 | 100 | A | Trimethylphosphate | 64 | B | 2.0 | Triethylamine | 0.3 | A |
| 26 | 100 | A | Phosphoric acid | 64 | B | 2.0 | Triethylamine | 0.3 | A |
| 27 | 100 | A | Tributylphosphate | 43 | B | 3.0 | Triethylamine | 0.1 | A |
| 28 | 100 | A | Trimethylphosphate | 43 | B | 3.0 | Tetraethyl ammonium hydroxide | 0.1 | A |
| Comparative | | | | | | | | | |
| 19 | — | — | — | — | — | — | Triethylamine | 0.1 | A |
| 20 | 100 | B | Trimethylphosphate | 64 | B | 2.0 | Triethylamine | 0.1 | B |
| 21 | 100 | A | Trimethylphosphate | 64 | A | 2.0 | Triethylamine | 0.1 | A |
| 22 | 100 | A | Trimethylphosphate | 129 | B | 1.0 | Triethylamine | 0.1 | A |
| 23 | 100 | A | Trimethylphosphate | 64 | B | 2.0 | Triethylamine | 3.0 | A |

| Example | Specific resistance ($\times 10^8 \cdot \Omega$cm) | Electrostatic adherence (maximum casting speed) (m/min) | Contents of diethylene glycol (mol %) | Heat resistance ($\Delta$ IV) | Number of coarce particle (not less than 5μ) (number/2.4 mm²) | Film haze (%) | Filtrability of oligomer (ton/m²) |
|---|---|---|---|---|---|---|---|
| 22 | 0.15 | 53 | 1.8 | 0.121 | 0 | 0.1 | >150 |
| 23 | 0.12 | 55 | 1.9 | 0.122 | 0 | 0.1 | >150 |
| 24 | 0.13 | 55 | 1.5 | 0.120 | 0 | 0.1 | >150 |
| 25 | 0.12 | 55 | 1.6 | 0.119 | 0 | 0.1 | >150 |
| 26 | 0.15 | 53 | 1.8 | 0.120 | 0 | 0.1 | >150 |
| 27 | 0.09 | <55 | 1.7 | 0.125 | 0 | 0.1 | >150 |
| 28 | 0.10 | 55 | 1.8 | 0.118 | 0 | 0.1 | >150 |
| Comparative | | | | | | | |
| 19 | 3.0 | 20 | 1.5 | 0.115 | 0 | 0.1 | >100 |
| 20 | 0.20 | 50 | 2.7 | 0.120 | 0 | 0.1 | 22 |
| 21 | 0.35 | 40 | 2.4 | 0.123 | 0 | 0.1 | >100 |
| 22 | 0.75 | 33 | 1.7 | 0.105 | 0 | 0.1 | >100 |
| 23 | 0.40 | 38 | 1.7 | 0.125 | 0 | 0.1 | >100 |

Note:
*A: first reaction vessel; B: second reaction vessel; C: slurry of terephthalic acid and ethylene glycol.

What is claimed is:

1. A process for production of a polyester comprising units of ethylene terephthalate as the major repeating units by supplying terephthalic acid and ethylene glycol continuously or intermittently to bis(beta-hydroxyethyl) terephthalate or its oligomer so as to carry out esterification under a pressure of not more than about 1.0 kg/cm², followed by polycondensation, which is characterized in that at least one magnesium compound is incorporated into the reaction system in an amount of about 30 to 400 ppm in terms of Mg to the polyester when the esterification rate in the step of esterification reaches about 20-80% and at least one phosphorus compound is incorporated into the reaction system in an amount as satisfying the following equation (I) at the stage after the esterification rate reaches not less than about 91% and before the termination of the initial condensation in the step of esterification:

$$1.2 \leq Mg/P \leq 20 \qquad (I)$$

wherein Mg/P is the atomic ratio of the magnesium atom to the phosphorus atom.

2. The process according to claim 1, at least one alkali metal compound is incorporated into the reaction system in an amount as satisfying the following equation (II) at any stage before the termination of the initial condensation in the step of esterification:

$$3.0 \leq M \leq 50 \quad (II)$$

wherein M is the amount (expressed in ppm) of the alkali metal comopound in terms of the alkali metal atom to the polyester.

3. The process according to claim 1, wherein at least one cobalt compound is incorporated into the reaction system in an amount as satisfying the following equation (III) at any stage before the termination of the initial condensation in the step of esterification:

$$3.0 \leq Co \leq 50 \quad (III)$$

wherein Co is the amount (expressed in ppm) of the cobalt compound in terms of the cobalt atom to the polyester.

4. The process according to claim 1, wherein at least one of tertiary amines and quaternary ammonium salts is incorporated into the reaction system in an amount of about 0.01 to 1 mol % to the polyester at any stage before the termination of the initial condensation in the step of esterification.

5. The process according to claim 2, wherein at least one cobalt compound is incorporated into the reaction system in an amount as satisfying the following equation (III) at any stage before the termination of the initial condensation in the step of esterification:

$$3.0 \leq Co \leq 50 \quad (III)$$

wherein Co is the amount (expressed in ppm) of the cobalt atom to the polyester.

* * * * *